United States Patent [19]

Lapeyre

[11] Patent Number: 4,556,142
[45] Date of Patent: Dec. 3, 1985

[54] LIGHTWEIGHT MODULAR CONVEYOR BELT

[75] Inventor: James M. Lapeyre, New Orleans, La.

[73] Assignee: The Laitram Corporation, New Orleans, La.

[21] Appl. No.: 457,482

[22] Filed: Jan. 12, 1983

[51] Int. Cl.[4] .............................................. B65G 17/10
[52] U.S. Cl. ...................................... 198/822; 198/853
[58] Field of Search ......................... 198/851, 853, 822

[56] References Cited

U.S. PATENT DOCUMENTS

| | | | |
|---|---|---|---|
| 3,233,722 | 2/1966 | Jorgensen | 198/822 |
| 3,724,285 | 4/1973 | Lapeyre | 198/853 |
| 4,051,949 | 10/1977 | Lapeyre | 198/853 |
| 4,159,763 | 7/1979 | Kewley et al. | 198/853 |

OTHER PUBLICATIONS

"Data Sheet" By Intralox, 1" Pitch Flush Grid Belting, pamphlet.
"Data Sheet" by Intralox, 1" Pitch Raised Rib Belt, pamphlet.
"Data Sheet" by Intralox, Side Guards, pamphlet.

Primary Examiner—Joseph E. Valenza
Attorney, Agent, or Firm—Weingarten, Schurgin, Gagnebin & Hayes

[57] ABSTRACT

A conveyor belt composed of interconnected identical modules of integral plastic molded construction. Each of the modules includes a multiplicity of elongated parallel spaced link elements terminating in respective link ends and an intermediate section between the link ends of grid-like structure. The link ends each include a generally cylindrical projection which extends from one side of each of the link elements along the pivotal axis of the module. The projections extend from the same facing side of each link element. The modules are linked together with each module rotated 180° with respect to adjacent modules such that the projections of each adjacent module extend in opposite directions. The flat sides of the linked ends of mated modules are in engagement to provide only a very small offset in the line of pull through the adjacent link elements to minimize bending forces in the links and link ends.

16 Claims, 16 Drawing Figures

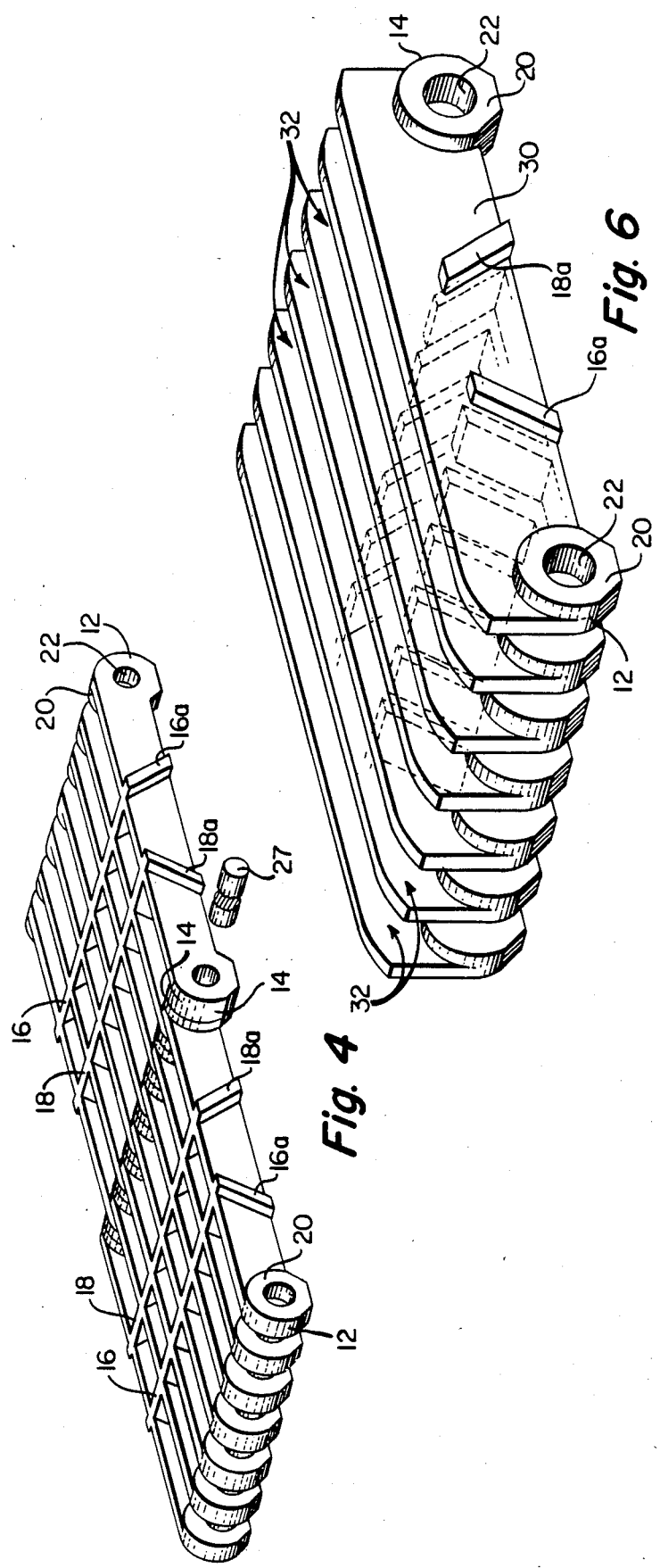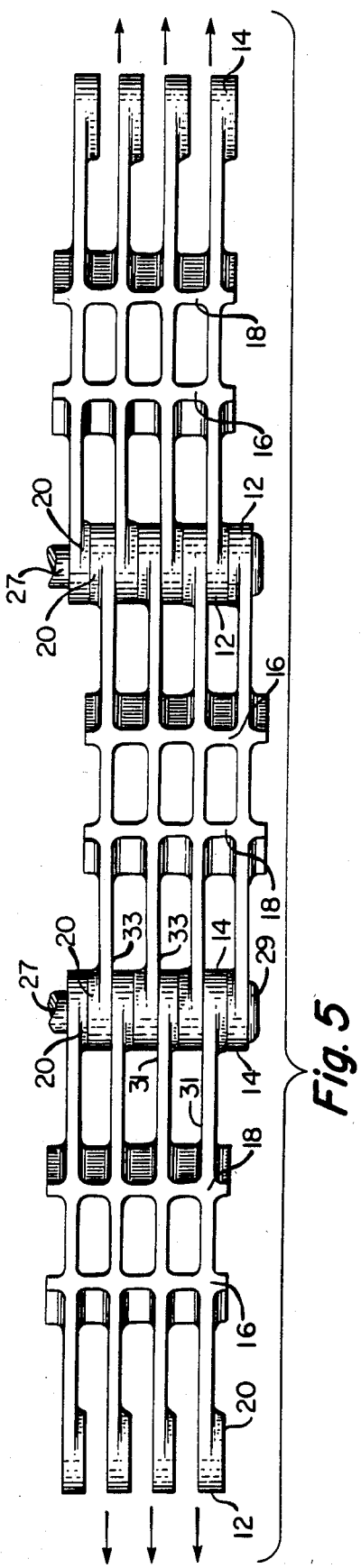

LIGHTWEIGHT MODULAR CONVEYOR BELT

FIELD OF THE INVENTION

This invention relates to conveyor belts and modules for the construction thereof, and more particularly to a modular conveyor belt comprising interconnected modules of the same integral construction.

BACKGROUND OF THE INVENTION

Modular conveyor belts are known which comprise modules pivotally connected to one another, each module being molded as a single unit, preferably of a plastic material. Such conveyor belts are shown, for example, in U.S. Pat. Nos. 3,870,141 and 4,051,949 of the same inventor and assignee as herein. Each module includes a number of parallel spaced links having end sections with aligned holes for accommodation of pivot rods, and intermediate sections joined by integral cross members to form a rigid supporting grid. The upper portions of the links and intermediate sections define a conveyor surface on which a product is carried. Alternatively, the link elements can extend upwardly to a plane which is above the plane of the upper portions of the intermediate sections to provide raised link elements or raised ribs which define parallel longitudinal channels between adjacent links, and in which channels a conveyor comb can be disposed for transfer of a product to and from the conveyor belt, as shown in the aforesaid U.S. Pat. No. 4,051,949.

In copending application Ser. No. 179,523 filed Aug. 19, 1980, a conveyor module is shown which includes sprocket recesses located midway between the pivot axes and which are adapted to mate with corresponding sprocket teeth of an associate sprocket wheel. The sprocket recesses are provided by angled surfaces of the intermediate sections. These intermediate sprocket recesses provide the benefit of minimizing chordal action and scrubbing between the mating surfaces of the module and sprocket.

SUMMARY OF THE INVENTION

The present invention provides a conveyor belt and module which is similar to and an improvement over the aforesaid structures. The conveyor belt is composed of a plurality of interconnected modules, each of identical construction and each including a multiplicity of elongated parallel spaced link elements terminating in first and second link ends. An intermediate section between the link ends is of grid-like structure providing a box beam across the width of the module for structural strength. This intermediate section also includes angled surfaces which define sprocket recesses located midway between the pivot axes and which are adapted to mate with corresponding sprocket teeth of an associated sprocket wheel. The link ends each include a generally cylindrical projection which extends from one side of each of the link elements along the transverse or pivotal axis of the module. The projections extend from the same facing side of each link element, the opposite side of the link elements being substantially flat and with only minimal, if any, outward projection. The link ends and projections contain openings which are aligned on respective pivotal axes of the module for accommodation of pivot rods by which interconnected modules are retained in linking engagement.

The modules are linked together with each module rotated 180° with respect to the mated modules such that the projections of each adjacent module extend in opposite directions. The flat sides of the linked ends of mated modules are in engagement to provide a very small offset in the line of pull through the adjacent link elements. As a result, the line of pull through the pivot rod is nearly in a pure shear condition, since the shear point is near the tensile members, thereby minimizing bending forces on the linked ends.

DESCRIPTION OF THE DRAWINGS

The invention will be more fully understood from the following detailed description taken in conjunction with the accompanying drawings, in which:

FIG. 4 is a pictorial view of interconnected modules of FIG. 1;

FIG. 5 is a top view of interconnected modules of FIG. 1;

FIG. 6 is a pictorial view of an alternative embodiment of the module of FIG. 1;

DETAILED DESCRIPTION OF THE INVENTION

Figure 1:
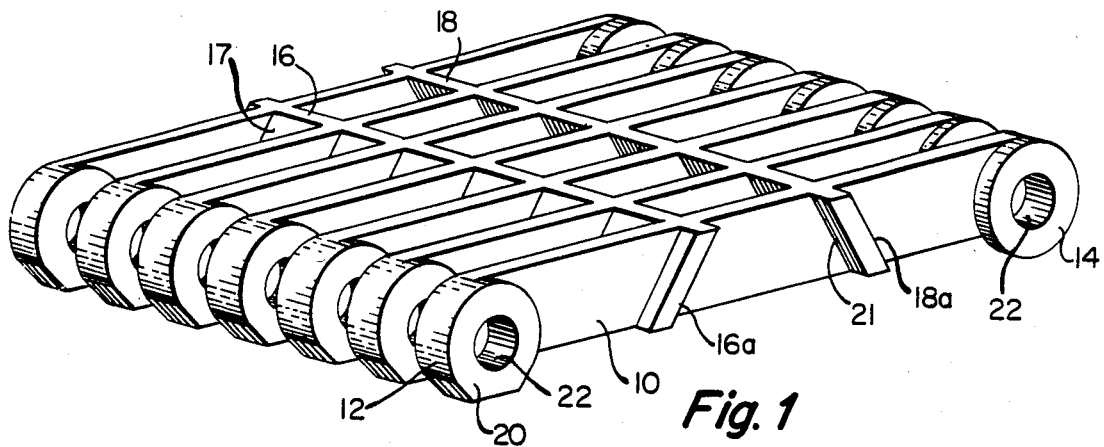
FIG. 1 is a pictorial view of a conveyor module embodying the invention.
Figure 2:
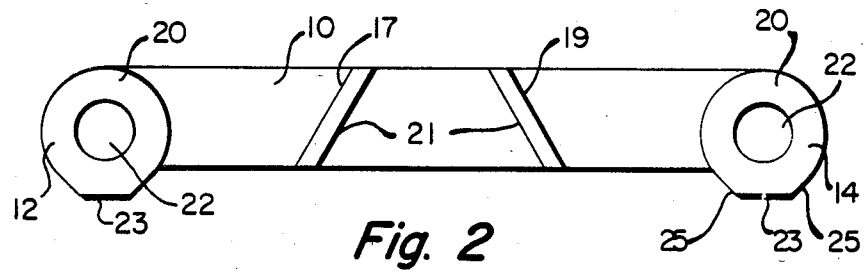
FIG. 2 is a side view of the module of FIG. 1.
Figure 3:
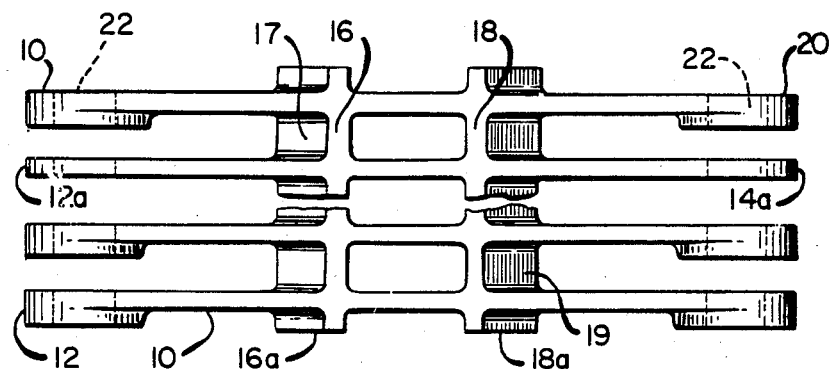
FIG. 3 is a cutaway top view of the module of FIG. 1.

A conveyor belt module in accordance with the invention is shown in FIGS. 1–3 and is integrally formed of a plastic material by a plastic molding process. The module includes a plurality of linear link elements 10, each terminating in respective link ends 12 and 14 and arranged in parallel relationship across the width of the module. The link elements 10 are spaced and joined by first and second transverse members 16 and 18 which have upper and lower edges which are coplanar with the respective upper and lower edges of the link elements 10. The transverse member 16 has sloping surfaces 17 which downwardly and outwardly extend toward link ends 12, while the transverse member 18 has sloping surfaces 19 which downwardly and outwardly extend toward link ends 14, the confronting sloping surfaces 21 defining sprocket recesses between the pivot axes and which are colinear with the spacing between adjacent link elements 10. The link elements 10 and transverse members 16 and 18 are preferably of uniform thickness to facilitate molding and preferably provide uniform thermal expansion and contraction in response to ambient temperature conditions. The open grid construction prevents any significant bending of the module about its longitudinal or transverse axes.

The link ends 12 and 14 each include a generally cylindrical projection 20 which extends from one side of each of the link elements along the transverse or pivotal axis of the module. The projections 20 extend from the same facing side of each link element, the opposite side of the link elements being substantially flat and with minimal, if any, outward projection. The link ends and projections 20 contain openings 22 which are aligned on respective pivotal axes of the module. The transverse members 16 and 18 include portions 16a and 18a which extend from the outer sides of the outer link elements 10 by an amount equal to the outward extent of the projections 20. The portions 16a and 18a serve to abut like portions of laterally adjacent modules to provide lateral support therefor. In the illustrated embodiment, the link ends include flattened sections 23 which serve as wear surfaces for riding on conveyor wear strips or support surfaces. The sloped surfaces 25 are for ease of mold construction. The surfaces 23 and 25 are not necessary but are convenient features.

The modules are linked together with like modules as shown in FIGS. 4 and 5. Each module is rotated 180° with respect to the mated modules such that the projections 20 of each adjacent module extend in opposite directions. A pivot rod or pin 27 is inserted in the aligned openings 22 of interconnected modules and retains the modules for pivotal movement with respect to each other. The pivot rods are typically formed of the same or compatible plastic material as the modules themselves, and are typically retained in the modules by headed ends 29 formed on the pivot rods. The flat sides 31 of the link ends of one module are in engagement with the flat sides 33 of the link ends of a mated module, as best seen in FIG. 5, to provide a very small offset in the line of pull through the adjacent link elements. As a result, the line of pull through the pivot rod is nearly in a pure shear condition, since the shear point is near the tensile members 10, thereby minimizing bending forces in the links 10 and in the link ends.

The projections 20 have a thickness slightly less than the spacing between adjacent link ends such that the link ends fit within the corresponding spacings of adjacent modules and are pivotable with respect thereto. The projections provide sufficient bearing surface with the pivot rod to accommodate the tensile forces on the belt during its driven operation.

Figure 7:
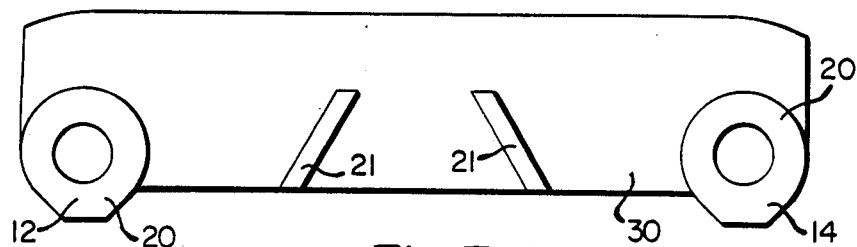
FIG. 7 is a side view of the module of FIG. 6.
Figure 8:
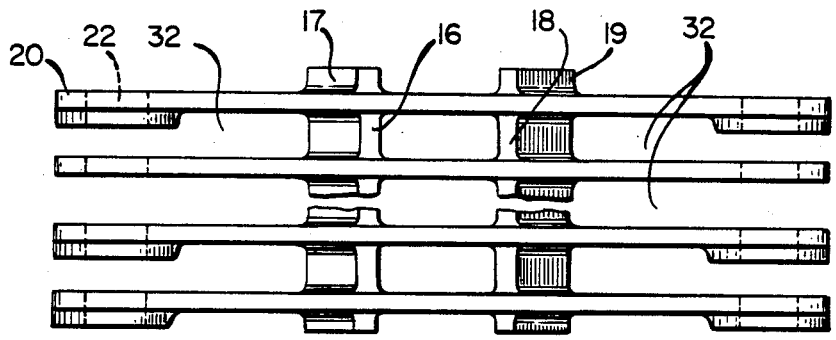
FIG. 8 is a cutaway top view of the module of FIGS. 6 and 7.
Figure 9:
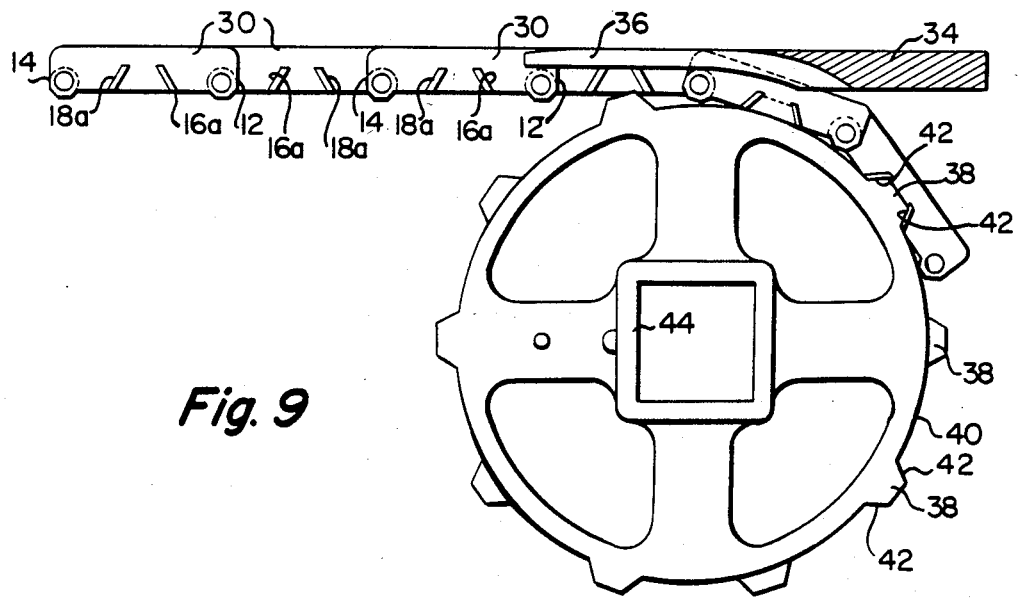
FIG. 9 is an elevation view of a modular conveyor belt embodying the module of FIG. 6 with a sprocket wheel and conveyor comb.
Figure 10:
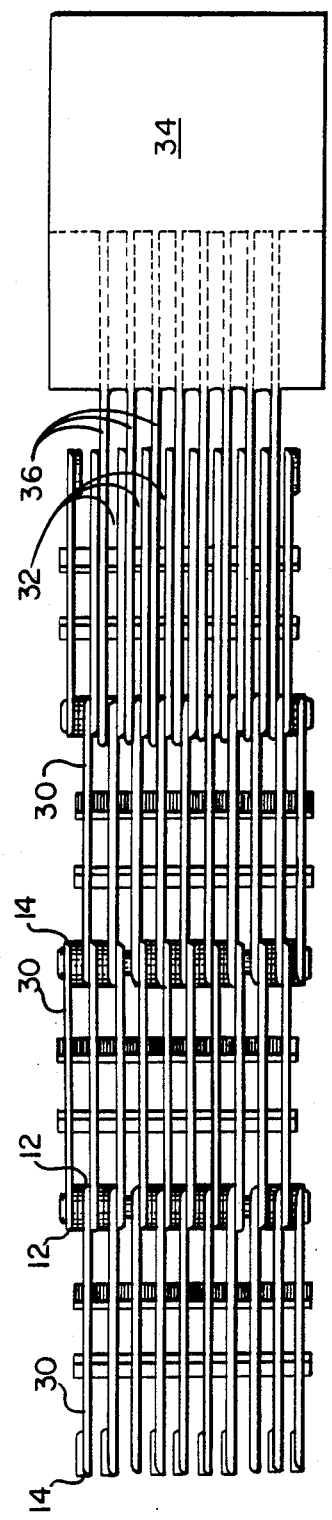
FIG. 10 is a top view of interconnected modules of FIG. 6 and cooperative with a conveyor comb.

An alternative module embodiment is shown in FIGS. 6-8 wherein the link elements 30 each extend upwardly to a plane which is above the plane at which the upper surfaces of the transverse members 16 and 18 terminate. These raised link elements, or raised ribs, define parallel longitudinal channels 32 between adjacent link elements. A conveyor comb 34 has its tines 36 disposed within the channels 32 in the manner shown in FIGS. 9 and 10, the upper surfaces of the tines being substantially at or slightly below the conveying surface and by which a product is removed from the conveyor belt as the conveyor traverses a downwardly curved path, as shown in FIG. 9. A module having raised ribs and usable with a conveyor comb is shown in U.S. Pat. No. 4,051,949 of the same inventor as herein and is also shown in copending application Ser. No. 179,523.

Figure 16:
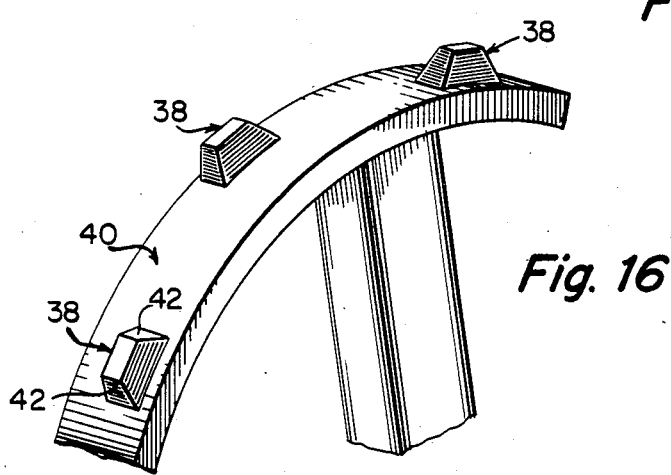
FIG. 16 is a partial perspective view of a sprocket wheel useful in the invention.

The inclined portions 17 and 19 of the transverse members 16 and 18 have confronting inner surfaces 21 which define sprocket recesses centrally disposed between the pivot axes of the module. The sprocket recesses are adapted to mate with corresponding sprocket teeth 38 of an associated sprocket wheel 40, as shown in FIG. 9. The sprocket wheel has teeth 38 with parallel side surfaces, and inclined front and back surfaces 42 configured to engage the corresponding surfaces 21 of the sprocket recesses. The teeth 38 are laterally offset to accommodate the offset recesses of the mated modules, as seen in FIG. 16. In the illustrated embodiment, the sprocket wheel 40 has a hub 44 adapted to be secured to a square shaft, and a plurality of sprocket wheels are employed across the width of the module to provide intended support and driving force. The centrally driven sprocket recesses provide the benefits of minimizing chordal action and scrubbing between the mating surfaces of the module and the sprocket wheel.

A centrally disposed sprocket recess employed in a different module is shown in copending application Ser. No. 179,523 of the same inventor as herein, and can be considered the inverse of the center sprocket tooth shown in copending application Ser. No. 228,154 of the same inventor. The placement of the sprocket recesses midway between the pivot axes and driving the modules at this mid-position, rather than driving the modules at the position of the pivot axes, provides substantially constant speed drive of the conveyor belt, substantially eliminates sprocket-to-belt wear, and provides a belt capable of faster running speeds than conventional belts by reason of the minimized chordal action and scrubbing. The inclined surfaces also serve to present greater surface area to water and/or steam jets which can be located above and below the modules for cleaning of the belt. The inclined surfaces also facilitate visual inspection of the belt.

The modules are preferably made in widths which are multiples of the smallest module width so that they can be arranged in brick-laid fashion to provide a conveyor belt of intended overall width. The modules are staggered laterally such that a module straddles laterally adjacent modules to achieve a belt which resists bending across the width of the belt.

The modules are preferably fabricated as an integral unitary structure by injection molding of a plastic material such as polyethylene and polypropylene. The particular plastic material is determined in accordance with the characteristics desired to suit a particular operating environment. The pivot rods are typically of the same or compatible plastic material.

Figure 11:
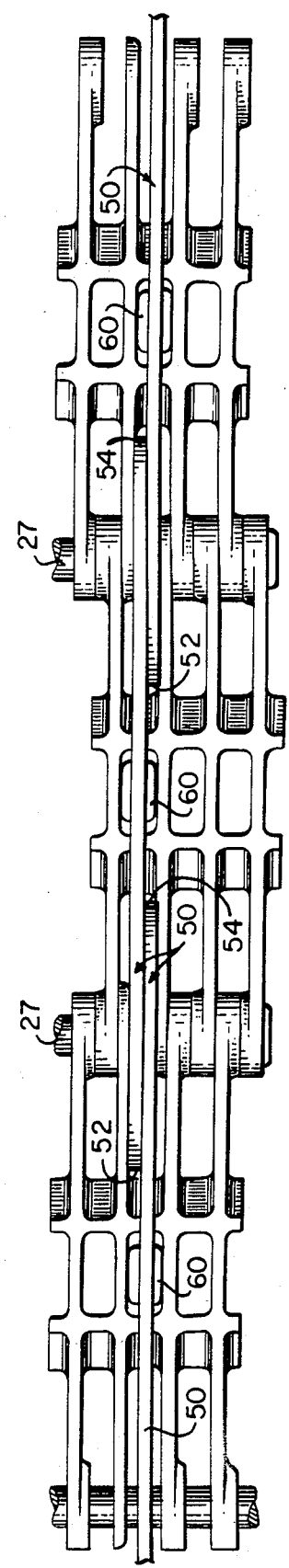
FIG. 11 is a cutaway top view of interconnected modules including side guards.
Figure 12:
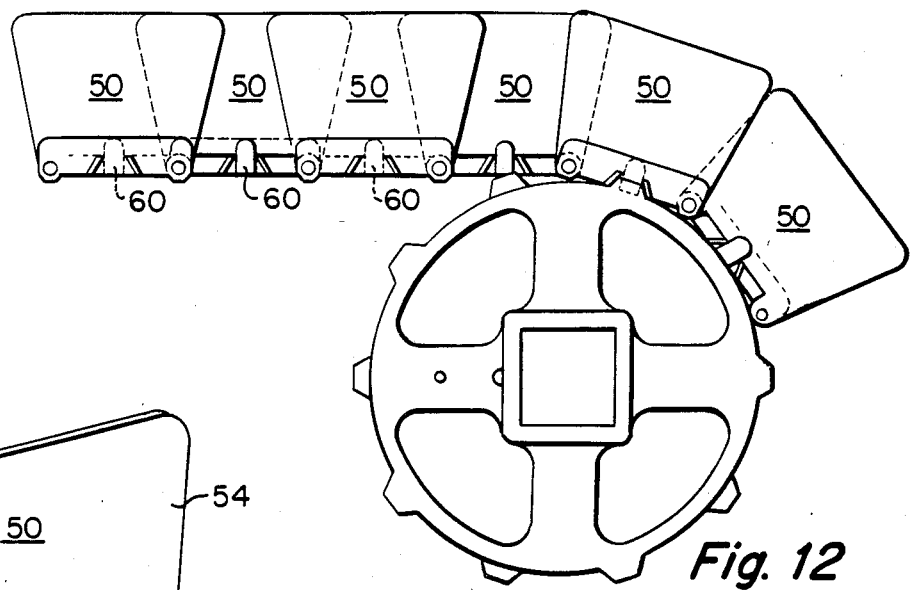
FIG. 12 is an elevation view of interconnected modules including side guards and cooperative with a sprocket wheel.
Figure 13:
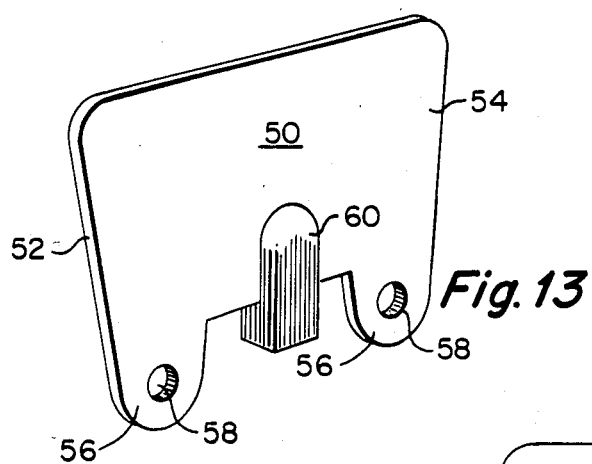
FIGS. 13, 14, and 15 are pictorial, side, and end views, respectively, of side guards useful with the conveyor belt of the invention.
Figure 14:
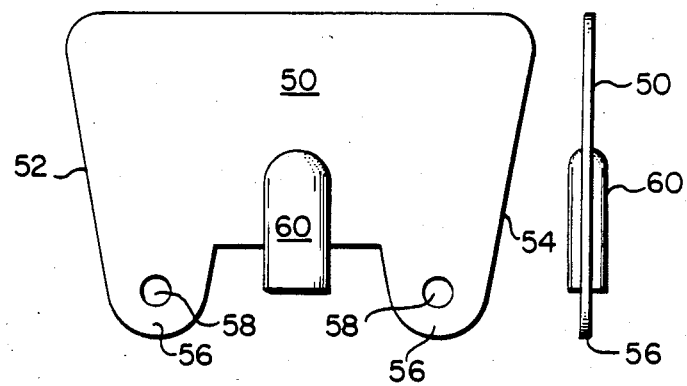
Figure 15:
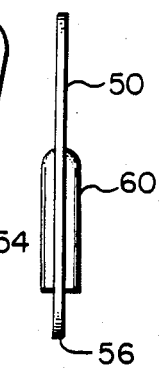

Selected link ends of the modules can have their lateral projections removed, as shown at link ends 12a and 14a in FIG. 3. The projections can be eliminated during fabrication of the module or can be removed after such fabrication, such as by machining the intended projections from the associated link ends. The increased spacing provided by the absence of projections provides room for belt attachments such as the side guards 50 illustrated in FIGS. 11-15. The side guard is of molded plastic having a relatively thin plate-like body with inwardly sloped edges 52 and 54, and a downwardly extending pair of flanges 56, each having an opening 58 therethrough. The flanges 56 and openings 58 are sized to be of the same pitch length as the associated module, and to fit into the projection-less link ends and to be retained therein by the pivot rod 22, in the manner illustrated in FIG. 11. A rib 60 protrudes from each side and downwardly of the guard 50 to provide for strengthening and stiffening thereof and is adapted to fit into the upper openings of the modules. The side guards are assembled with the ends overlapping, as seen in FIG. 12. As the connected modules are conveyed around a sprocket wheel, the adjacent guards slidably move but remain in overlapping engagement to provide an effectively continuous side barrier for the belt. Typically, side guards are employed near the side edges of the connected modules to contain a product within a channel between the pair of guards. Alternatively, guards can be provided along the center of the conveyor belt to separate the belt into left and right halves, as is desirable for some conveying purposes.

The invention is not to be limited except as indicated in the appended claims.

What is claimed is:

1. A conveyor belt composed of a plurality of linked modules each of substantially identical pitch dimensions and each of integral plastic molded construction, each module comprising:

a plurality of linear parallel spaced link elements, the length of the module being equal to the length of the link elements, and the width of the module being determined by the number of link elements;

the link elements terminating in first and second pluralities of link ends, each link end being formed to circumscribe a pivot hole;

a grid structure integral with the link elements and disposed between the link ends and having longitudinal members integral with the link elements and extending along the length of the modules and having two cross members integral with the link elements and extending across the width of the module which separate and join longitudinal members and link elements;

the cross members being spaced along the length of the module and angularly disposed to provide sprocket recesses intermediate the pivot axes of the module and adapted to mate with corresponding sprocket teeth of a sprocket wheel;

the cross members having upper and lower surfaces coplanar with respective upper and lower surfaces of the link elements;

substantially all of said link ends including a projection extending transversely of the module toward a confronting link end and terminating short of the confronting link end by an amount to accommodate the link end of a mated module, each of the projections being on the same facing side of respective link elements, the opposite side of respective link elements being substantially flat and without projections, each of the projections having an opening therethrough in alignment with the pivot hole of the associated link ends;

the modules being linked together by pivot rods with each module rotated 180° with respect to the mated modules such that the projections of each adjacent module extend in opposite directions, with the flat sides of the link ends of one module being in engagement with the flat sides of the link ends of mated modules to provide a line of pull through the pivot rod near the link elements;

predetermined link ends of the modules have no projections such that increased spacing is provided at the mated link ends at which there is no projection to accommodate belt attachments disposed within the increased spacing;

a plurality of side guards each having a relatively thin plate-like body and an outwardly extending pair of flanges, each flange having an opening therethrough, the flanges and openings being of the same pitch length as the associated modules;

the flanges being adapted to fit into the increased spacings of mated link ends and retained therein by the pivot rods.

2. The conveyor belt of claim 1 wherein the projections of the link ends each are generally cylindrical and have an opening therethrough which is a continuation of the pivot hole in the respective link end.

3. The conveyor belt of claim 1 wherein each of the link elements have the same length, height, and thickness.

4. The conveyor belt of claim 3 wherein the link elements and grid structure are of uniform wall thickness.

5. The conveyor belt of claim 1 wherein the modules are linked together by pivot rods each disposed in the aligned openings of mated link ends.

6. The conveyor belt of claim 5 wherein the pivot rods are of a plastic material compatible with that of the modules.

7. The conveyor belt of claim 1 wherein the projections have a thickness slightly less than the spacing between adjacent link ends to accommodate the link ends of a mated module for pivotal movement, the projections providing sufficient bearing surface with the pivot rod to accommodate the tensile forces on the belt during its driven operation.

8. The conveyor belt of claim 1 wherein the sprocket recesses of mated modules are offset across the width of the module;

the sprocket wheel having sprocket teeth each being offset with respect to adjacent sprocket teeth to mate with the offset recesses of the mated modules.

9. The conveyor belt of claim 1 wherein the outer link elements include elements which outwardly extend from the outer sides of the outer link elements by an amount equal to the outward extent of the projections on the outer link elements, the elements being operative to abut like elements of laterally adjacent modules in an assembled belt.

10. The conveyor belt of claim 9 wherein the outwardly extending elements are extensions of the cross members.

11. The conveyor belt of claim 1 wherein the side guards each include a rib outwardly extending from the plate-like body between the flanges and adapted to be retained in confronting recesses of the modules.

12. The conveyor belt of claim 11 wherein the side guards have a configuration for overlapping like side guards of an assembled belt to provide an effectively continuous side barrier for the belt.

13. A conveyor belt composed of a plurality of linked modules each of substantially identical pitch dimensions and each of integral plastic molded construction, each module comprising:

a plurality of linear parallel spaced link elements, the length of the module being equal to the length of the link elements, and the width of the module being determined by the number of link elements;

the link elements terminating in first and second pluralities of link ends, each link end being formed to circumscribe a pivot hole;

a grid structure integral with the link elements and disposed between the link ends and having longitudinal members integral with the link elements and extending along the length of the modules and having two cross members integral with the link elements and extending across the width of the module which separate and join longitudinal members and link elements;

the cross members having coplanar upper surfaces and being spaced along the length of the module and angularly disposed to provide sprocket recesses intermediate the pivot axes of the module and adapted to mate with corresponding sprocket teeth of a sprocket wheel;

the link elements extending upwardly to a plane above the plane of the upper surfaces of the cross members, the upwardly extending link elements defining parallel channels between adjacent link elements for receiving a conveyor comb having tines disposed in the longitudinal channels;

substantially all of said link ends including a projection extending transversely of the module toward a confronting link end and terminating short of the confronting link end by an amount to accommodate the link end of a mated module, each of the projections being on the same facing side of respective link elements, the opposite side of respective link elements being substantially flat and without projections, each of the projections having an opening therethrough in alignment with the pivot hole of the associated link ends;

the modules being linked together by pivot rods with each module rotated 180° with respect to the mated modules such that the projections of each adjacent module extend in opposite directions, with the flat sides of the link ends of one module being in engagement with the flat sides of the link ends of mated modules to provide a line of pull through the pivot rod near the link elements;

predetermined link ends of the modules have no projections such that increased spacing is provided at the mated link ends at which there is no projection to accommodate belt attachments disposed within the increased spacing;

a plurality of side guards each having a relatively thin plate-like body and an outwardly extending pair of flanges, each flange having an opening therethrough, the flanges and openings being of the same pitch length as the associated modules;

the flanges being adapted to fit into the increased spacings of mated link ends and retained therein by the pivot rods.

14. A conveyor belt composed of a plurality of linked modules each of substantially identical pitch dimensions and each of integral plastic molded construction, each module comprising:

a plurality of linear parallel spaced link elements, the length of the module being equal to the length of the link elements, and the width of the module being determined by the number of link elements;

the link elements terminating in first and second pluralities of link ends, each link end being formed to circumscribe a pivot hole;

a grid structure integral with the link elements and disposed between the link ends and having longitudinal members integral with the link elements and extending along the length of the modules and having at least one cross member integral with the link elements and extending across the width of the module for separating and joining longitudinal members and link elements;

a working surface spaced along the length of the module and disposed orthogonally to the length of the module to provide a sprocket recess intermediate the pivot axes of the module and adapted to mate with corresponding sprocket teeth of a sprocket wheel;

the cross members having upper and low surfaces;

substantially all of said link ends including a projection extending transversely of the module toward a confronting link end and terminating short of the confronting link end by an amount to accommodate the link end of a mated module, each of the projections being on the same facing side of respective link elements, the opposite side of respective link elements being substantially flat and without projections, each of the projections having an opening therethrough in alignment with the pivot hole of the associated link ends;

the modules being linked together by pivot rods with each module rotated 180° with respect to the mated modules such that the projections of each adjacent module extend in opposite directions, with the flat sides of the link ends of one module being in engagement with the flat sides of the link ends of mated modules to provide a line of pull through the pivot rod near the link elements;

predetermined link ends of the modules have no projections such that increased spacing is provided at the mated link ends at which there is no projection to accommodate belt attachments disposed within the increasing spacing;

a plurality of side guards each having a relatively thin plate-like body and an outwardly extending pair of flanges, each flange having an opening therethrough, the flanges and openings being of the same pitch length as the associated modules;

the flanges being adapted to fit into the increased spacings of mated link ends and retained therein by the pivot rods.

15. The conveyor belt of chain 14 wherein said working surface is integral with said cross member.

16. The conveyor belt of claim 14 wherein the projections have a thickness slightly less than the spacing between adjacent link ends to accommodate the link ends of a mated module for pivotal movement, the projections providing sufficient bearing surface with the pivot rod to accommodate the tensile forces on the belt during its driven operation.

* * * * *